Patented Aug. 29, 1950

2,520,234

UNITED STATES PATENT OFFICE 2,520,234

METHOD OF PREPARING 7-HYDROXY-STEROLS AND ESTERS

Jan Anne Keverling Buisman, Eindhoven, Netherlands, assignor to Hartford National Bank and Trust Company, Hartford, Conn., as trustee No Drawing. Application April 28, 1947, Serial No. 744,531. In the Netherlands June 7, 1946

7 Claims. (Cl. 260—397.2)

This invention relates to a method of preparing 7-hydroxysterols and esters.

As is well-known, 7-hydroxycholesterol is of particular interest since it is possible to prepare therefrom 7-dehydrocholesterol provitamin D₃.

The known methods are based on oxidation of a sterol or sterol ester (vide, for example, J. Chem. Sec., 1936, page 1437, Arkiv för Kemi, etc. Bd. 16A, No. 10, p. 1.–72). Particular attention was attracted at the time by the method described in American patent specification 2,098,984, according to which 7-oxosterol esters obtained by oxidation are converted into 7-hydroxysterols by reduction and hydrolysis.

According to the invention, 7-hydroxysterols and esters are prepared by quite different means, and this by using as initial material 7-halogensterol esters and replacing the halogen atom in the 7-position thereof by a hydroxyl group by treating 7-halogen-sterol-3-mono-ester with an inorganic base, if desired with simultaneous or subsequent conversion of the derivative obtained into 7-hydroxysterol.

Suitable means for substituting the 7-halogen atom are, for example, highly-diluted alcoholic lye, aluminum oxide standardised by Brockmann, and silver oxide.

The conversion of 7-halogen-sterol esters into 7-hydroxysterols my be effected in one stage by hydrolysis with alcoholic lye, the concentration of which is strong enough, in addition to the substitution of a hydroxyl group for the 7-halogen atom, to hydrolise also the ester group in the 3-position.

Esters of a high aliphatic acid, such as stearic acid, or of an aromatic acid are very suitable for use of the invention with a great yield. The use of the benzoic acid esters affords particular advantages.

Example I 528 mgs. of cholesterol benzoate are treated with the equivalent quantity of N-bromsuccinimide in 10 cc. of boiling carbon tetrachloride. After the reaction, the succinimide is separated by filtering and the filtrate evaporated in vacuo. The remaining syrup is dissolved in 10 ccm. of benzene-acetone mixture 1+1 and the solution filtered through a column of aluminium oxide (standardised by Brockmann). The column is subsequently rinsed with 50 ccm. of benzene-acetone 1+1, the collected filtrates being distilled in vacuo. The residue (475 mgs.) is dissolved in 15 ccm. of petroleum ether and led through a fresh column of aluminium oxide (standardised by Brockmann). The column is washed successively with benzene, benzene ether 1+1, and ethyl acetate. The benzene-ether fraction yields, upon vaporisation, 154 mgs. of colourless crystals (7-β-hydroxycholesterol-3-benzoate±30% of the theoretical yield). From this we obtain, after saponification with alcoholic lye and repeated re-crystallisation from methanol, needles which melt at 182–184° C. (corrected) and which, together with 7-β-hydroxycholesterol prepared according to Barr c. s., do not bring about any depression of the melting point and exhibit a specific rotation in chloroform $(a)_D^{20} = 91°$.

II. Benzene-ether fraction is obtained by chromatographic analysis in the same manner as described in Example I. The residue of this fraction as re-crystallized from petroleum ether. Upon cooling, large colourless crystals are obtained, melting at 165–166° C. and consisting of 7-β-hydroxycholesterol-3-monobenzoate, since 7-β-hydroxycholesterol is obtained therefrom by hydrolysis.

III. 488 mgs. of cholesterol benzoate are treated with 180 mgs. of bromsuccinimide in 10 ccm. of boiling carbon tetrachloride. After cooling and filtration of the succinimide, the solution of carbon tetrachloride, which contains the 7-bromcholesterol-benzoate, has added to it 375 mgs. of KOH dissolved in little water and much alcohol so as to obtain a homogeneous solution. After standing for 2½ hours at room temperature, water and ether are added to the mixture, the etheric solution after drying being distilled. The residue is dissolved in benzene and the solution filtered through a column of aluminium oxide (standardised by Brockmann). The column is subsequently washed with benzene and then with benzene ether 1+1. The benzene-ether fraction, after distillation and re-crystallisation of the residue from petroleum ether, yields crystals which metal at 165–166° C. and which, combined with those of Example II, do not produce any depression of the melting point.

IV. 1 gr. of 7-bromocholesterol-benzoate, obtained by treatment of cholesterol-benzoate with N-bromylsuccinimide, is dissolved in 20 ccm. of ether, followed by addition of a suspension of silver oxide in little ether, prepared from 500 mgs. of silver nitrate. The mixture is stored at room temperature whilst shaking now and then. After standing overnight, filtration takes place, the residue being thoroughly washed with ether. The collected filtrates are dried to thickness and the residue (800 mgs.) is subjected to chromatographic purification, as described in Example I. After recrystallisation from petroleum-ether, methanol and again petroleum-ether, the benzene-ether fraction (216 mgs.) yields colourless needles which, on account of their melting point and mixture melting-point (190–191° C.), are 7-α-hydroxycholesterol-3-benzoate.

V. 5 grs. of cholesterol stearate are heated with 1.4 grs. of bromsuccinimide in boiling carbon tetrachloride for some minutes, whereby bromination occurs. After separation of the succinimide by filtration, the carbon tetrachloride is distilled off in vacuo, leaving a solid substance. This substance has added to it a little acetone, whereby a solid substance crystallizes. After sucking off and drying in vacuo, this substance weighs 4.8 grs. (raw 7-bromocholesterol stearate). The substance is suspended in 200 ccm. of alcohol, followed by addition of a solution of 1 gr. of sodium hydroxide in 50 ccm. of alcohol. Water and ether are added after 2½ hours. The ether layer contains 5 grs. of yellow oil which becomes semi-solid and which in the ether-benzene fraction yields 750 mgs. of solid substance by chromatographic analysis in a column of aluminium oxide standardised by Brockmann. After recrystallization from alcohol, the crystals melt at 71–75° C. The crystals give the correct analysis values for carbon and hydrogen, reckoned with respect to 7-hydroxy-cholesterol-3-stearate.

In my copending application for U. S. patent, Serial No. 744,530, filed April 28, 1947, there is described a method of preparing 7-dehydrosterols and esters, which consists in that water is split off from 7-hydroxysterols esterified only in the 3-position, with the aid of a solution of an inorganic acid halide or acid-oxy-halide in a tertiary amine, if desired followed by conversion of the 7-dehydrosterol esters obtained into 7-dehydrosterols. This method used in addition to the method as above-described forms a new way concerning the two stages for the preparation of 7-dehydrosterols and more particularly of 7-dehydrocholesterol from 7-halogensterol esters.

In order to convert the 7-hydroxysterol into 7-dehydrosterol, an example taken from my copending application referred to above will be given below.

A mixture consisting of 50 mgs. of phosphor oxy-chloride, 2 ccm. of dimethyl aniline, 1 ccm. of collidine and 50 mgs. of 7-α-hydroxycholesterol-3-benzoate is boiled in a nitrogen atmosphere for 5 minutes on a free flame. Subsequently, the mixture is additioned by 15 ccm. of 3% alcoholic potash and boiled for half an hour, also in a nitrogen atmosphere. Next, the content of sterol (51%), precipitatable with digitomine, of the reaction product is determined and in the sterol digitomide obtained, the content of 7-dehydrocholesterol (73%) is determined spectrographically. The 7-dehydrocholesterol yield consequently amounts to 37%.

What I claim is:
1. A method of preparing 7-hydroxysterols and the esters thereof comprising the steps of treating a 7-halogenosterol-3-monoester with an inorganic base, and replacing the halogen atom at the 7-position in the sterol nucleus with a hydroxyl group.

2. A method of preparing a 7-hydroxysterol comprising the steps of treating a 7-halogenosterol-3-monoester with an inorganic base, replacing the halogen atom at the 7-position in the sterol nucleus with a hydroxyl group, and converting the resulting esterified 7-hydroxysterol into 7-hydroxysterol.

3. A method of preparing a 7-hydroxysterol comprising the steps of treating a 7-halogenosterol-3-monoester with an inorganic base, replacing the halogen atom at the 7-position in the sterol nucleus with a hydroxyl group, and hydrolysing the ester group in the 3-position in the sterol nucleus.

4. A method of preparing a 7-hydroxysterol comprising the steps of halogenating a 3-monoester of cholesterol to produce a 7-halogenosterol-3-monoester, treating said 7-halogenosterol-3-monoester with an inorganic base, replacing the halogen atom at the 7-position in the sterol nucleus with a hydroxyl group, and hydrolysing the ester group in the 3-position in sterol nucleus to a hydroxyl group.

5. A method of preparing a 7-hydroxysterol comprising the steps of treating a 7-halogenosterol-3-monoester with alcoholic lye, substituting a hydroxyl group for the halogen atom at the 7-position in the sterol nucleus, and hydrolysing the ester group in the 3-position of the sterol nucleus into a hydroxyl group.

6. A method of preparing a 7-hydroxysterol comprising the steps of brominating cholesterolbenzoate with N-bromosuccinimide, treating the resulting brominated cholesterolbenzoate with an inorganic base, substituting a hydroxyl group for the bromine atom at the 7-position in the sterol nucleus, and hydrolysing the ester group in the 3-position of the sterol nucleus into a hydroxyl group.

7. A method of preparing a 7-hydroxysterol comprising the steps of brominating cholesterol stearate with N-bromosuccinimide, treating the resulting brominated cholesterol stearate with an inorganic base, substituting a hydroxyl group for the bromine atom at the 7-position in the sterol nucleus, and hydrolysing the ester group in the 3-position of the sterol nucleus into a hydroxyl group.

JAN ANNE KEVERLING BUISMAN.

REFERENCES CITED

The following references are of record in the file of this patent:

UNITED STATES PATENTS

| Number | Name | Date |
|---|---|---|
| 2,177,355 | Marker | Oct. 24, 1939 |

FOREIGN PATENTS

| Number | Country | Date |
|---|---|---|
| 574,432 | Great Britain | Jan. 4, 1946 |

OTHER REFERENCES

Henbest: Nature 158, 950 (1946).